United States Patent Office 2,770,573
Patented Nov. 13, 1956

2,770,573

ENZYMATIC SYNTHESIS OF N-ACETYLGLU-COSAMINIDO GALACTOSE AND GALACTO-SIDO-N-ACETYL GLUCOSAMINE

Paul György, Villanova, and Friedrich Zilliken, Philadelphia, Pa., assignors to American Home Products Corporation, New York, N. Y., a corporation of Delaware No Drawing. Application December 10, 1953,
Serial No. 397,469

4 Claims. (Cl. 195—28)

This invention relates to an improved process for the preparation of substances having a high activity for promoting the growth of the microorganism Lactobacillus bifidus, especially such strains thereof as L. bifidus var. Penn which require the presence of a specific growth-promoting factor in order that they may grow and propagate.

It has recently been discovered that a specific growth-promoting factor which is present in human (breast) milk is essential to promote the growth of a specific strain of the Lactobacillus bifidus microorganism, this specific strain being originally identified as No. 212A and, more recently, as L. bifidus var. Penn. This microorganism has been known for some time to constitute an important part of the intestinal flora of a breast-fed infant.

The specific growth-promoting factor for Lactobacillus bifidus, and its importance in infant nutrition, can be best explained with reference to the growth and proliferation of the Lactobacillus bifidus microorganism in the intestinal tract of the young child, particularly in the intestinal tract of those infants who are fed exclusively with human or breast milk.

Lactobacillus bifidus constitutes the predominant microorganism of the flora present in the stools of breast-fed infants. As grown in colonies in the intestinal tract of infants nursed with human (breast) milk, the organism is gram-positive. Morphologically it comprises straight or curved rods which are non-motile and which do not form spores. One end of the rod may be bulbous or racket-shaped, and one or both ends may appear to be split longitudinally to give the effect of two short branches. Lateral branches of relatively short length may also be present. This appearance of the microorganism as it propagates has led to its characterization as "bifid."

The L. bifidus microorganism grows in cultures under anaerobic or microaerophilic conditions, which are herein defined as those in which the oxygen content is less than from 2 to 4%. It will continue to grow for an indefinite period in numerous subcultures provided the necessary microaerophilic conditions are strictly maintained.

By the third or fourth day after birth, the intestinal flora of the breast-fed infant is characterized by the presence of Lactobacillus bifidus as the predominating microorganism. In the stools of breast-fed infants practically the entire flora is made up of this organism.

The predominance of this microorganism in the intestinal tract and feces is characteristic only of those infants who are fed human (breast) milk. Infants who are fed with the milk of other animals, such as cow's milk, or with preparations in which cow's milk is an important constituent, do not show this predominance of L. bifidus, the microorganism content of their feces comprising a less uniform flora with an appreciable proportion of gram-negative rods and cocci.

The fact that a stable L. bifidus flora is characterisic only of the intestinal tract of breast-fed infants is now fully understood and appreciated by pediatricians and other specialists in the medical, biological, and nutritional sciences. See, for example, the publications of Tissier; Comptes rendus soc. biol., 51, pages 943–945; and 60, pages 359–361; and Ann. inst. Pasteur, 19, pages 109–123; and 22, pages 189–207. See also the papers of Moro; Wien. klin. Wochschr., 13, pages 114–115, and Jahrb. Kinderheilk., 61, pages 687–734; and 61, pages 870–899. That the original observations of Tissier concerning the predominance of L. bifidus in nursling's stools have been amply confirmed is pointed out in the more recent publication of Norris, Flanders, Tomarelli and György in the Journal of Bacteriology, 60, pages 681–696 (December 1950).

Medical authorities are now in general agreement that many of the advantages which a breast-fed infant seems to have, insofar as its nutrition and resistance to certain diseases are concerned, are attributable, at least in part, to the predominance in the intestines of L. bifidus. The predominance of this organism is now believed to be of physiological significance, and its growth may prevent intestinal disorders caused by other bacteria. Resistance to bacterial intestinal diseases, and even to parenteral disorders, such as respiratory infections, is typical of breast-fed infants, infants who are bottle-fed with the milk of cows and other animals being markedly more susceptible to such disorders. In this connection see the article of Robinson, Lancet, "Infant Morbidity and Mortality," vol. CCLX, page 788 (April 7, 1951).

In the infant colon in which a stable L. bifidus flora is lacking, it is now generally believed that the infant is more likely to suffer from disorders attributable to the growth of other bacteria, some of which are harmful to the infant, since competition for the available food supply in the infant intestinal tract where L. bifidus flourish reduces the possibility that other bacteria, particularly the harmful B. coli, may grow in considerable numbers or in extensive colonies. In any event, where the gram-positive bacillus L. bifidus is present in large numbers in the infant intestine, which occurs only when the infant is breast-fed, there is considerably less growth of other microorganisms, particularly the gram-negative B. coli, Clostridia, and air-borne microorganisms, such as the Sarcinae bacteria. While the reasons for the superior resistance to disease of breast-fed infants, as compared with infants who are fed on cow's milk, or on the usual infant formulas in which cow's milk is a principal constituent, are not fully understood, pediatricians are generally agreed, however, that in some measure at least the superior resistance is attributable to the growth of an extensive L. bifidus flora in the intestines of nurslings, this bacterium being absent in any appreciable numbers from the intestines of all infants except those who are nursed with human milk. Interest in the isolation and determination of the growth requirements of L. bifidus has therefore been stimulated by its apparently unique predominance in the intestinal tract of the breast-fed infant.

For some time research has been carried out in an effort to isolate and identify the active biological factor which is responsible for promoting the growth of some strains of the microorganism, Lactobacillus bifidus. In the co-pending patent application of György, Kuhn and Zilliken, Serial No. 283,006, filed April 18, 1952, the isolation and recovery of this growth-promoting factor from human milk is described and claimed.

By a process which involves defatting human milk, removing substantially all protein therefrom, removing inorganic and mineral substances then remaining in the human milk fraction, and finally by adsorbing the active growth-promoting factor or principle on a solid adsorbent and eluting it therefrom by means of suitable eluants, the new growth-promoting factor for *Lactobacillus bifidus* was recovered from breast milk.

As recovered in the form of a dry powder, and as described in said patent application, the new biologically-active material is identified as being non-protein in character. It is free from amino acids, peptides and proteins. It does not give a positive test with ninhydrin, but after acid hydrolysis the ninhydrin test becomes positive, due to the formation of d-glucosamine.

Chemically the new *Lactobacillus bifidus* growth-promoting factor is characterized as comprising substances of the group of N-glycosides containing N-acetyl-hexosamines in glycosidic linkage. Upon hydrolysis under acid conditions it is converted to hexosamines, as determined colorimetrically by the Morgan-Elson test.

The new growth-promoting factor contains the chemical elements hydrogen, nitrogen, carbon and oxygen, but it does not contain either sulfur or phosphorus. Its nitrogen content is relatively low, falling within the range 1.7% to 2.0%. It is adsorbed on adsorbent agents such as carbon, charcoal, cellulosic products such as filter paper, adsorbing resins, and cellulosic powders, being, however, most typically and most easily adsorbed on the carbonaceous adsorbents. It is extremely resistant to high temperatures, and will withstand temperatures well over 100° C., as, for example, when it is sterilized by heating under pressure in aqueous solutions at a temperature of 120° C. for 15 minutes or longer. The growth-promoting factor of human milk is present in a large proportion in a dialyzable form; (see the article by György in Pediatrics, vol. 11, No. 2, pages 98–102; February 1953). In addition to the dialyzable fraction, a varying portion of the growth factor is present in a non-dialyzable form. The latter may be precipitated by ethanol at a concentration between 60–80%.

The infrared absorption spectrum of a mineral oil mull of the *Lactobacillus bifidus* growth-promoting factor exhibits characteristic maxima at approximately the following wave lengths: 3700, 3000, 2360, 1820, 1600, 1500, 1410, 1190, 920, 830, 800 and 740 cm.$^{-1}$. Of these, the maxima at 1820, 1410, 920, 830, 800 and 740 cm.$^{-1}$ are broad maxima. The maxima at 3700, 3000, 1600 and 1500 cm.$^{-1}$ are relatively sharper peaks.

As recovered from breast milk, the *Lactobacillus bifidus* growth-promoting factor is found to have an activity for promoting the growth of strains of the *Lactobacillus bifidus* microorganism, typically the *L. bifidus* var. Penn strain, American Type Culture Collection No. 11,863, which is more than ten times that of the human milk fraction initially subjected to adsorption in the process by which the factor is recovered from human milk. Hereinafter, whenever the *Lactobacillus bifidus* growth-promoting factor is referred to, this material is the biologically-active substance intended.

In view of the importance of the *Lactobacillus bifidus* var. Penn strain as recovered from the feces of breast-fed infants and characterized serologically in nutrition, and especially in infant nutrition, considerable research work has been carried out with this special strain. The fact that it needs human milk (or the growth factor present in human milk), for its propagation and growth, and shows no growth in usual mediums satisfactory for most strains of *L. bifidus*, was recognized by one of us, and this characteristic of the var. Penn strain (previously identified as Strain No. 212A) has been discussed in a paper published in Pediatrics, vol. 11, No. 2 (February 1953), pages 98 to 108, the paper being entitled "A hitherto unrecognized biochemical difference between human milk and cow's milk." This strain of the microorganism is also referred to (under the designation No. 212A) in an article by Williams, Norris and György, which is published under the title: "Antigenic and cultural relationships of *Lactobacillus bifidus* and *Lactobacillus parabifidus*" in the March-April 1953 issue of the Journal of Infectious Diseases, vol. 92, pp. 121–131.

It is pointed out in that article that this specific strain will not grow in the chemically defined medium of Norris et al. (Jour. of Bacteriology; 60, pp. 681–696), unless breast milk is added as a supplement to this medium. The growth requirements of this variant of the *Lactobacillus bifidus* microorganisms, with special reference to the fact that var. Penn will grow in the regular medium for *Lactobacillus bifidus* only after human milk has been added thereto, are further discussed in a paper by György, Norris and Rose entitled "Bifidus factor. I. A variant of *Lactobacillus bifidus* requiring a special growth factor," which is shortly to be published in the scientific journal Archives of Biochemistry and Biophysics.

This variant of the *L. bifidus* microorganism, which showed scant or undetectable growth in the usual medium, i. e., that of Norris et al., and which requires human milk, or the active *L. bifidus* growth-promoting factor contained therein, for its growth, does not differ morphologically from regular strains of the microorganism. Thus, *Lactobacillus bifidus* var. Penn, American Type Culture Collection No. 11,863 is microaerophilic and gram positive, showing typical branching. Serologically, however, it appears to contain a distinct antigenic component, different from that found in other strains of *L. bifidus*. Moreover, the new strain is characterized by distinct lability, sometimes showing a tendency towards the formation of very mucoid colonies on plates and greatly increased viscosity in liquid mediums. Such mucoid colonies retain, in repeated transfer, their mucoid character, and no reversion to the original non-mucoid strain has been observed. These mucoid colonies, however, still require the presence of human milk (or the growth-promoting factor contained therein), for their growth.

Regular strains of *Lactobacillus bifidus* may utilize maltose interchangeable with lactose. In contrast thereto, *L. bifidus* var. Penn, in addition to the growth factor, requires lactose as its source of carbohydrate. It will show only very scant growth in the presence of maltose. Except as to its requirement for lactose and for the special growth factor present in human milk in order that appreciable growth may occur, differences in the metabolic pattern of *L. bifidus* var. Penn from that of regular bifid strains of the *Lactobacillus bifidus* microorganism have not been observed.

Since the discovery that the *Lactobacillus bifidus* var. Penn strain, one of the important constituent strains present in the intestinal flora of a nursling, would grow only in the presence of a special nutritional factor which is present in human milk (which factor has been termed the *Lactobacillus bifidus* growth-promoting factor), attempts have been made to find other materials which would supply this growth-promoting factor in addition to human milk. Among substances that have been found active, there may be mentioned β-methyl-N-acetyl-d-glucosaminide and variously treated naturally occurring products such as hydrolyzed chitin as derived from the crab and lobster shell. Various other materials, including hog gastric mucin, N-acetyl-d-glucosamine itself, and blood group substances A and O, have also been found active.

Our invention is concerned with the preparation by means of enzymatic synthesis of a substance which possesses a high activity for promoting the growth of *Lactobacillus bifidus* var. Penn, i. e., is a very potent source of the *Lactobacillus bifidus* growth-promoting factor. This enzymatic synthesis effects a transgalactosidation reaction under the catalytic action of specific enzymes whereby the starting materials are converted to a material possessing high activity for promoting the growth of the var. Penn strain of the microorganism.

In carrying out this reaction we preferably react lactose and N-acetyl-d-glucosamine in a molar ratio of 2 moles of the lactose to 1 mole of N-acetyl-d-glucosamine. In place of the acetyl glucosamine it is also possible to react with the lactose glycosides, such as β-methyl-N- acetyl-glucosaminide, chitodextrin, chitin which has been purified by reprecipitation from a solvent, or methanolized chitin, although N-acetyl-d-glucosamine is our preferred starting material. It may be remarked that methanolized chitin is the product resulting from reacting chitin and methanol at a relatively low temperature and under anhydrous conditions in the presence of an acid catalyst, in accordance with the process described in the co-pending application of György, Kuhn and Zilliken, Serial No. 290,325, filed May 27, 1952.

The enzyme, lactase, which is utilized in our enzymatic synthesis should preferably be one derived from the microorganism Lactobacillus bifidus var. Penn. This is effective in the synthesis within a pH range of 4.0 to 7.0, optimum results being secured at a pH of approximately 5.4. It is possible, under some circumstances, to replace the lactase enzyme derived from L. bifidus var. Penn by some other commercially obtainable enzymatic preparations, such as the Rohm & Haas commercial, bacterially-produced lactase which is sold under the designation "Lactase B." However, the enzyme as derived from the var. Penn strain of the microorganism is much more effective and is preferred. It should be noted that if commercial lactase preparations, such as "Lactase B," are employed, the pH at which the enzymatic synthesis is carried out should be somewhat higher, falling within the range 6.5–7.0. For best results the pH for such lactase preparations should be approximately 6.8.

In preparing an enzyme for use in our process from the L. bifidus var. Penn strain of the microorganism, the bacterium is grown on a medium containing all nutrients including the Lactobacillus bifidus growth-promoting factor, which are necessary for its growth and propagation. A suitable medium, to which breast milk or some other material supplying the Lactobacillus bifidus growth-promoting factor should be added, is disclosed in the copending application of György, Serial No. 276,435, filed March 13, 1952, now abandoned.

It contains, in addition to some substance supplying the growth-promoting factor and mineral salts, additional substances such as potassium acid phosphate, lactose, sodium acetate, hydrolyzed casein, various amino acids, thiamine, riboflavin, calcium pantothenate, and various other vitamins.

After the bacterium is fully grown, it is separated from the culture medium, preferably by centrifuging, using a Sharples centrifuge operating at 12,000–15,000 R. P. M. The solid is lyophilized to secure a dry product. This dry product is then ground with approximately equal parts by weight of aluminum oxide, $Al_2O_3$, in the presence of a phosphate buffer solution. A suitable phosphate buffer solution adapted to maintain a pH of approximately 6.0–6.2 may comprise a 0.1 molar solution of a mixture of sodium and potassium phosphates, such as disodium orthophosphate, $Na_2HPO_4$, and dipotassium orthophosphate, $K_2HPO_4$.

The liquid is now centrifuged to free it from the ground-up bacterial cells. The resulting cell-free enzyme solution can be standardized, using for the purpose a reduction titration with lactose. It can also be evaporated to dryness to give a solid enzyme product which is the enzymatic catalyst preferably used in our process.

In carrying out the process, commercial lactose, and either N-acetyl-d-glucosamine or one of the other replacements therefor referred to above, are brought together in a molar ratio of 2:1 in the presence of the lactase enzyme. This enzyme is preferably the enzyme derived from L. bifidus var. Penn in accordance with the procedure described above, and it is effective within the pH range 4.0–7.0, optimum results being obtained at a pH of 5.4. In addition to the lactose, N-acetyl-d-glucosamine, and enzyme, there should also be present in the substrate a phosphate buffer, comprising, preferably, a mixture of sodium and potassium phosphates capable of maintaining the pH within the range at which the reaction will proceed. When it is desired to maintain a pH of approximately 5.4, this may constitute a 0.1 molar solution of a mixture of disodium phosphate, $Na_2HPO_4$, and dipotassium phosphate, $K_2HPO_4$.

The reaction proceeds most satisfactorily at a temperature of approximately 37° C., although temperatures as low as room temperature (15° C.) may be used, with resulting slowing up of the reaction. It is generally undesirable to operate at a temperature in excess of about 40° C. as the destruction of the enzyme occurs at such temperatures. Generally the reaction is completed in a short period of time, as, for example, in 4 hours.

There is thus obtained a mixture containing, in addition to unreacted materials and by-products, the two compounds, N-acetyl-glucosamindo galactose and galactosido - N - acetylglucosamine, in approximately equal amounts. Of these two compounds, the galactosido-N-acetylglucosamine is practically inactive for promoting the growth of Lactobacillus bifidus var. Penn, while the other compound, N-acetylglucosaminido galactose, has a high activity for promoting the growth of this particular strain of the microorganism. Its activity has been determined to be such that 80 micrograms of the substance, when added to a medium, are sufficient to provide a growth response equivalent to 1 György unit. The György unit for determining the quantitative amount of L. bifidus growth-promoting factor present is based on a scale wherein 1 György unit is supplied by the presence of 0.06 milliliter of human milk of average L. bifidus growth-promoting factor content.

The chemical structure of these two compounds, produced in admixture in accordance with our enzymatic synthesis process, is as follows:

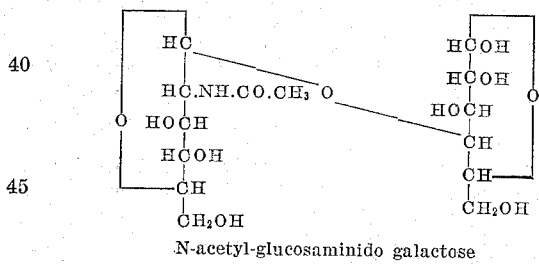

N-acetyl-glucosaminido galactose

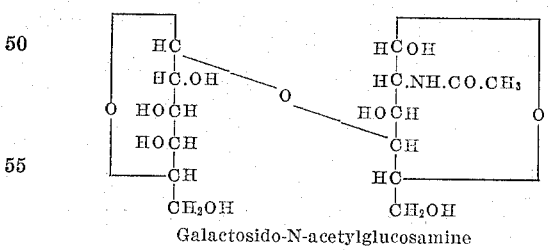

Galactosido-N-acetylglucosamine

At the conclusion of the reaction it is possible to recover the active material, i. e., the mixture of the two disaccharidic substances, in substantially pure form, from the reaction mixture by a process which involves deproteinization followed by chromatography separation, preferably on a column comprising two parts of charcoal and one part of diatomaceous earth. The dry material may be used as such as a source of the L. bifidus growth-promoting factor by adding it to foodstuffs which are totally lacking in, or which are deficient in, this important nutritional factor. Examples of such foodstuffs are infant feeding compositions which are based essentially on cow's milk, since cow's milk may be regarded as of no practical value as a source of the growth-promoting factor, as its content therein is extremely low. Alternatively, the dry powdered material may be subjected to chemical treatment, such as with acetic anhydride and pyridine, to secure a peracetylated product which is useful for identification and for other purposes.

As an example of our process for the preparation of materials active in supporting the growth of L. bifidus var. Penn, the details and procedure given herein may be regarded as illustrative.

*Example*

Ten grams of lactose and 5 g. N-acetyl-d-glucosamine were dissolved in 180 ml. of an aqueous 0.1 molar phosphate buffer solution having a pH of 5.4. To the resulting solution there was added 800 milligrams of the crude enzyme preparation derived from L. bifidus var. Penn as described above.

The mixture was incubated for 4 hours at a temperature of 37° C., whereupon the enzymatic action was stopped by heating the solution at 100° C. for approximately 60 minutes. The coagulated enzyme was removed by means of a centrifugal separator, and the clear supernatant liquid was treated with a mixture of chloroform and isoamyl alcohol (4 parts of chloroform to 1 part of the alcohol, by volume) in order to remove remaining traces of protein from the liquid.

The completely deproteinized solution was then evaporated to dryness, and the resulting dry product dissolved in 50 milliliters of water. The aqueous solution was then subjected to chromatography, using a column packed with a mixture of 2 parts of charcoal and 1 part of diatomaceous earth. The product sold under the trademark name "Celite" by Johns-Manville Corporation was utilized as the diatomaceous earth. In recovering the active material, the column was washed first with 13 liters of water; then with 2% liters of 2.5% aqueous ethanol; then with 6 liters of 5% aqueous ethanol; and finally with 20 liters of 7.5% aqueous ethanol. The latter 7.5% aqueous ethanol fractions contained the two disaccharidic substances contaminated by the presence of only traces of other sugar-like products. These fractions were collected and evaporated to dryness at a reduced pressure of less than atmospheric. This resulted in a dry powdered residue possessing activity for promoting the growth of Lactobacillus bifidus var. Penn and comprising, essentially, a mixture of the two substances, the structural formulae of which have been given above.

The product, which may be termed "an enriched lactose," was added, as such and without further purification, to foodstuffs which were both deficient in, and totally lacking in, the L. bifidus growth-promoting factor. In this way the resulting food products were analogous to human milk in that they contained this important nutritional factor.

Various modifications and variations in our process, a preferred embodiment of which has been herein set forth, will be apparent to those skilled in the art. To the extent that these are within the scope of the appended claims, they are to be considered as part of our invention.

We claim:

1. The process of preparing a mixture containing N-acetyl-glucosaminido galactose and galactosido-N-acetyl glucosamine, said mixture having high activity for promoting the growth of Lactobacillus bifidus var. Penn, A. T. C. C. No. 11,863, which comprises reacting lactose and N-acetyl-d-glucosamine in the presence of an enzyme present in growing cultures of said Lactobacillus bifidus var. Penn microorganism and secured therefrom by centrifuging a growing culture of said microorganism in order that said enzyme may be separated therefrom, lyophilizing the separated solid product, and intimately mixing the dry product resulting with aluminum oxide in the presence of a phosphate buffer solution, thereby securing a solution of said enzyme.

2. The process of preparing a mixture containing N-acetyl-glucosaminido galactose and galactosido-N-acetyl glucosamine, said mixture having high activity for promoting the growth of Lactobacillus bifidus var. Penn, A. T. C. C. No. 11,863, which comprises reacting lactose and N-acetyl-d-glucosamine at a temperature within the range 15° to 40° C. and at a pH within the range 4.0 to 7.0, said reaction being carried out in the presence of an enzyme present in growing cultures of said Lactobacillus bifidus var. Penn microorganism and secured therefrom by centrifuging a growing culture of said microorganism in order that said enzyme may be separated therefrom, lyophilizing the separated solid product, and intimately mixing the dry product resulting with aluminum oxide in the presence of a phosphate buffer solution, thereby securing a solution of said enzyme.

3. The process of preparing a mixture containing N-acetyl-glucosaminido galactose and galactosido-N-acetyl glucosamine, said mixture having high activity for promoting the growth of Lactobacillus bifidus var. Penn, A. T. C. C. No. 11,863, which comprises reacting lactose and N-acetyl-d-glucosamine by bringing said reactants together in the molar ratio of two moles of lactose to one mole of N-acetyl-glucosamine at a temperature of approximately 37° C. and at a pH of approximately 5.4, said reaction being carried out in the presence of an enzyme present in growing cultures of said Lactobacillus bifidus var. Penn microorganism and secured therefrom by centrifuging a growing culture of said microorganism in order that said enzyme may be separated therefrom, lyophilizing the separated solid product, and intimately mixing the dry product resulting with aluminum oxide in the presence of a phosphate buffer solution, thereby securing a solution of said enzyme.

4. The process defined in claim 3 wherein said pH is maintained by the presence in said reaction mixture, together with said reactants, of a phosphate buffer mixture capable of maintaining said specified pH.

References Cited in the file of this patent

Tauber: Chemistry and Technology of Enzymes, John Wiley and Sons, Inc., 1949, pages 57 and 58.